United States Patent
Chen et al.

(10) Patent No.: US 12,289,747 B2
(45) Date of Patent: Apr. 29, 2025

(54) METHOD AND APPARATUS FOR RESOURCE CONFIGURATION FOR SIDELINK IN INTERNET OF VEHICLES

(71) Applicant: ZTE Corporation, Shenzhen (CN)

(72) Inventors: Lin Chen, Guangdong (CN); Mengzhen Wang, Guangdong (CN); Boyuan Zhang, Guangdong (CN); Ying Huang, Guangdong (CN); Wei Luo, Guangdong (CN); Wei Zou, Guangdong (CN)

(73) Assignee: ZTE Corporation, Guangdong (CN)

( * ) Notice: Subject to any disclaimer, the term of this patent is extended or adjusted under 35 U.S.C. 154(b) by 685 days.

(21) Appl. No.: 17/172,831

(22) Filed: Feb. 10, 2021

(65) Prior Publication Data

US 2021/0168814 A1 Jun. 3, 2021

Related U.S. Application Data

(63) Continuation of application No. PCT/CN2019/100191, filed on Aug. 12, 2019.

(30) Foreign Application Priority Data

Aug. 10, 2018 (CN) .......................... 201810912172.4

(51) Int. Cl.
*H04W 72/04* (2023.01)
*H04W 4/46* (2018.01)
(Continued)

(52) U.S. Cl.
CPC ............. *H04W 72/53* (2023.01); *H04W 4/46* (2018.02); *H04W 72/0453* (2013.01); *H04W 72/56* (2023.01); *H04W 76/11* (2018.02)

(58) Field of Classification Search
CPC ....... H04W 72/04; H04W 72/10; H04W 4/30; H04W 72/53; H04W 4/46;
(Continued)

(56) References Cited

U.S. PATENT DOCUMENTS 10,743,161 B2 * 8/2020 Agiwal et al. .......... H04W 4/70
2015/0043545 A1 * 2/2015 Cheng et al. ......... H04W 8/005
(Continued)

FOREIGN PATENT DOCUMENTS

| CN | 104703224 A | 6/2015 |
| CN | 105813204 A | 7/2016 |

(Continued)

OTHER PUBLICATIONS

Han: Communication Method and Device; CN 109412771 A (Year: 2019).*

(Continued)

*Primary Examiner* — Meless N Zewdu
(74) *Attorney, Agent, or Firm* — Crowell & Moring LLP

(57) ABSTRACT

Provided are a method and apparatus for resource configuration for a sidelink in Internet of vehicles. The method includes: a terminal receiving configuration information about a sidelink Bandwidth part (BWP)/resource pool; and the terminal performing sidelink data transmission according to the received configuration information about the sidelink BWP/resource pool.

12 Claims, 6 Drawing Sheets

(51) Int. Cl.
*H04W 72/0453* (2023.01)
*H04W 72/53* (2023.01)
*H04W 72/56* (2023.01)
*H04W 76/11* (2018.01)

(58) Field of Classification Search
CPC . H04W 72/0453; H04W 72/56; H04W 76/11; H04W 76/14; H04W 72/02; H04W 4/40; H04W 92/18; H04W 28/18; H04W 28/20; H04W 72/51; H04W 72/20; H04W 72/25; H04W 72/40; H04W 4/38; H04W 4/44; H04W 4/50; H04W 4/70; H04W 4/80; H04W 28/0967; H04W 28/0958; H04W 28/16; H04W 28/24; H04W 72/54; H04W 72/542; H04W 72/5423; H04W 88/00; H04W 88/02; H04W 88/08; H04W 72/12; H04L 5/0007; H04L 5/001; H04L 5/0044; H04L 5/0094; H04L 5/00; H04B 7/06954; H04Q 3/0066

See application file for complete search history.

(56) References Cited

U.S. PATENT DOCUMENTS

| | | | |
|---|---|---|---|
| 2018/0098322 A1 | 4/2018 | Yoon | |
| 2018/0183551 A1* | 6/2018 | Chou et al. | H04L 5/0042 |
| 2018/0255532 A1* | 9/2018 | Li et al. | H04W 72/042 |
| 2019/0029029 A1* | 1/2019 | Ohtsuji et al. | H04W 72/121 |
| 2020/0029384 A1* | 1/2020 | Hong et al. | H04W 76/19 |
| 2021/0006954 A1 | 1/2021 | Xu et al. | |

FOREIGN PATENT DOCUMENTS

| | | |
|---|---|---|
| CN | 106792890 A | 5/2017 |
| CN | 107040864 A | 8/2017 |
| CN | 108024283 A | 5/2018 |
| CN | 108260163 A | 7/2018 |
| EP | 3 242 515 A1 | 11/2017 |
| WO | WO 2017/133646 A1 | 8/2017 |
| WO | WO-2019158185 A1 * 8/2019 ............ H04W 24/10 |

OTHER PUBLICATIONS

Sarun et al.: NR V2X Resource Pool Design; WO 2020030688 A1 (Year: 2020).*
Jin et al.: Apparatus and Method for Transmitting and Receiving a Sidelink Synchronization Signal in a New Radio; KR 20200017737 A (Year: 2020).*
Osawa, et al.: Communication Device; CN 112292893 A (Year: 2021).*
Lilei et al.: User Equipment, Base Station and Wireless Communication Method; KR 20210020000 A (Year: 2021).*
Yang Ning (KR 20200109329 A) >>> Resource Allocation Method, Network Device, Terminal Device and Computer Storage Medium (see title). (Year: 2018).*
Liu et al; (CN 109845320 B) >>> Method and Device for Data Transmission Based on Service Quality (see title, abstract and background) (Year: 2020).*
CN 108024283 A) >>> Resource Pool Allocation Method and Device (see title). (Year: 2018).*
WO 2020030177 A1) >>> Method and Apparatus for Resource Configuration for Sidelink in Internet of Vehicles (see title). (Year: 2020).*
Notice ofthe First Office Action and Search Report for Chinese application No. 201810912172.4 dated Aug. 17, 2022, 9p, in Chinese language.
English language translation of Notice ofthe First Office Action and Search Report for Chinese application No. 201810912172.4 dated Aug. 17, 2022, 12p.
Extended European Search Report for EP 19 84 7454 dated Oct. 11, 2021, 9p.
International Search Report for international application No. PCT/CN2019/100191, dated Nov. 1, 2019, 4 pages, with English language translation.
Huwaei et al., RP-180890, "Views on 5G V2X Work in Rel-16," 3GPP TSG RAN #80, 3GPP, Jun. 4, 2018 (12 pp.).
Ericsson, R1-180905, "Remaining Issues of the DCI Contents and Formats" 3GPP TSG RAN #92, 3GPP, Feb. 17, 2018 (10 pp.).
Huwaei et al., R1-1800018, "Remaining Issues on Bandwidth Part and Wideband Operation" 3GPP TSG RAN #AH, 3GPP, Jan. 13, 2018 (14 pp.).
Ericsson, R2-11713516, "Sidelink Carrier Selection Criteria for TX" 3GPP TSG RAN WG2 #100, 3GPP, Nov. 17, 2017 (5 pp.).
ZTE, R2-1713072, Discussion on Sidelink Resource Request Mechanism in PC5 CA, 3GPP TSG RAN WG2 #100, 3GPP, Nov. 17, 2017 (7 pp.).
Communication for EP Application No. EP Patent Application No. 19 847 454.6 dated Mar. 15, 2024 (6 pp.).
ZTE: "Discussion on carrier selection in PC5 CA", 3GPP Draft; R2-1713070, 3rd Generation Partnership Project (3GPP), Mobile Competence Centre; 650 Route Des Lucioles; F-06921 Sophia-Antipolis Cedex; France, vol. RAN WG2 no. Reno, USA; Nov. 27, 2017-Dec. 1, 2017, Nov. 17, 2017, XP05131898, Retrieved from the Internet: URL:http:www.3gpp.org/ftp/tsg%5Fran/WG2%5FRL2/TSGR2%5F100/Docs/(6 pp.).

* cited by examiner

METHOD AND APPARATUS FOR RESOURCE CONFIGURATION FOR SIDELINK IN INTERNET OF VEHICLES

RELATED APPLICATIONS

This application is a continuation of International Patent Application No. PCT/CN2019/100191, filed Aug. 12, 2019, which claims priority to Chinese patent application No. 201810912172.4 filed with the CNIPA on Aug. 10, 2018. The entireties of the above applications are incorporated herein by reference.

TECHNICAL FIELD

The present application relates to the field of communications, for example, to a method and apparatus for resource configuration for a sidelink in Internet of vehicles.

BACKGROUND

Internet of vehicles refers to a large system network for performing wireless communications and information exchange between a vehicle and a vehicle, between a vehicle and a pedestrian, between a vehicle and an infrastructure and between a vehicle and the Internet in accordance with agreed communication protocols and data interaction standards. The communication of Internet of vehicles ensures the driving safety of the vehicle, improves the transport efficiency, and provides the vehicle with convenience or entertainment information. According to the objects involved in the wireless communications, the communication of Internet of vehicles includes three different types: vehicle-to-vehicle (V2V) communication, vehicle-to-infrastructure/vehicle-to-network (V2I/V2N) communication and vehicle-to-pedestrian (V2P) communication. These three types are collectively referred to as vehicle to everything (V2X) communication.

In the research of V2X communication based on long term evolution (LTE) organized by the 3rd generation partnership project (3GPP), the V2X communication method based on a sidelink between user equipments (UEs) is one way of implementing V2X standards. That is, service data is directly transmitted from a source user equipment to a destination user equipment through an air interface without being forwarded by a base station and a core network. Such V2X communication method is simply referred to as PC5-based V2X communication or V2X sidelink communication.

As technologies progress and automation industries develop, the V2X communication scenario is further extended and has higher performance requirements. An advanced V2X service is mainly divided into four categories: vehicle platooning, extended sensors, advanced driving (semi-automated or full-automated driving) and remote driving. Performance requirements to be met are as follows: a packet size supporting 50 bytes to 12000 bytes, a transmission rate of 2 messages to 50 messages per second, a maximum end-to-end latency of 3 ms to 500 ms, a reliability of 90% to 99.999%, a data rate of 0.5 Mbps to 1000 Mbps, and a transmission range supporting 50 m to 1000 m. 3GPP has approved the research of communication of Internet of vehicles based on 5th Generation (5G), but no communication of Internet of vehicles based on a 5G air interface or based on a 5G sidelink exists in the related art.

In view of the preceding problem in the related art, no effective scheme has yet been proposed.

SUMMARY

A method and apparatus for resource configuration for a sidelink in Internet of vehicles are provided in the embodiments of the present disclosure to at least solve the problem that no communication of Internet of vehicles based on a 5G sidelink exists in the related art.

According to an embodiment of the present disclosure, a method for resource configuration for a sidelink in Internet of vehicles is provided. The method includes the following steps: a terminal receives configuration information about a sidelink bandwidth part (BWP)/resource pool; and the terminal performs sidelink data transmission according to the received configuration information about the sidelink BWP/resource pool.

According to another embodiment of the present disclosure, an apparatus for resource configuration for a sidelink in Internet of vehicles is provided. The apparatus includes a first reception module and a transmission module, the first reception module is configured to receive configuration information about a sidelink BWP/resource pool and the transmission module is configured to perform sidelink data transmission according to the received configuration information about the sidelink BWP/resource pool.

According to another embodiment of the present disclosure, a storage medium is further provided. The storage medium is configured to store a computer program. When the computer program is executed, performs the steps in the preceding embodiment of a method for resource configuration for a sidelink in Internet of vehicles.

According to another embodiment of the present disclosure, an electronic apparatus is provided and includes a memory and a processor. The memory is configured to store a computer program, and the processor is configured to execute the computer program to perform the steps in the preceding embodiment of a method for resource configuration for a sidelink in Internet of vehicles.

According to the present application, the terminal may receive configuration information about a sidelink BWP/resource pool and perform the sidelink data transmission according to the configuration information about the sidelink BWP/resource pool, thus achieving the communication of Internet of vehicles based on a 5G sidelink, solving the problem that no communication of Internet of vehicles based on a 5G sidelink exists in the related art, and filling the blank in the related art.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. In the drawings.

DETAILED DESCRIPTION

Hereinafter, the present application will be described in detail with reference to drawings and in conjunction with embodiments. It is to be noted that if not in collision, the embodiments and features therein in the present application may be combined with one another.

It is to be noted that the terms "first", "second" and the like in the description, claims and drawings of the present application are used to distinguish between similar objects and are not necessarily used to describe a particular order or sequence.

Embodiment One

Figure 1:
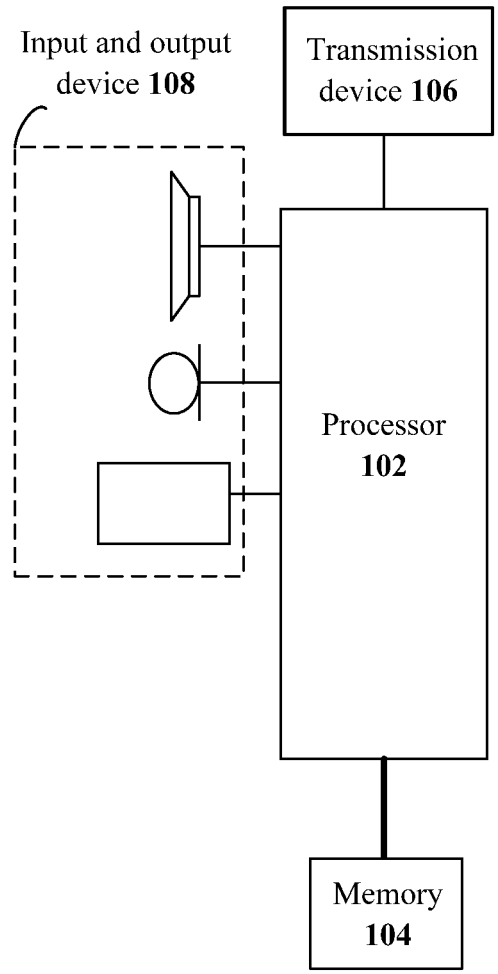
FIG. 1 is a block diagram of hardware of a terminal for executing a method for resource configuration for a sidelink in Internet of vehicles according to an embodiment of the present disclosure.

The method embodiment provided by embodiment one of the present application may be executed on a terminal, a computer terminal or other similar computing apparatuses. The method to be executed in the terminal is used as an example. FIG. 1 is a block diagram of hardware of a terminal executing a method for resource configuration for a sidelink in Internet of vehicles according to an embodiment of the present disclosure. As shown in FIG. 1, a terminal 10 may include one or more (merely one is shown in FIG. 1) processors 102 (the processors 102 may include, but are not limited to, a microcontroller unit (MCU), a field-programmable gate array (FPGA) and other processing apparatuses), and also a memory 104 used for storing data. Alternatively, the preceding terminal may further include a transmission device 106 for implementing the communication function and an input and output device 108. It is to be understood by those of ordinary skill in the art that the structure shown in FIG. 1 is merely illustrative and not intended to limit the structure of the preceding terminal. For example, the terminal 10 may further include more or less components than the components shown in FIG. 1, or has a configuration different from the configuration shown in FIG. 1.

The memory 104 may be configured to store a computer program, such as a software program and module of application software, e.g., the computer program corresponding to the method for resource configuration for a sidelink in Internet of vehicles in the embodiment of the present disclosure. The processor 102 executes the computer program stored in the memory 104 to perform various functional applications and data processing, that is, to implement the preceding method. The memory 104 may include a high-speed random access memory and may further include a nonvolatile memory such as one or more magnetic storage apparatuses, flash memories, or other nonvolatile solid-state memories. In some examples, the memory 104 may further include memories that are remotely disposed with respect to the processors 102. These remote memories may be connected to the terminal 10 via a network. The examples of the preceding network include, but are not limited to, the Internet, an intranet, a local area network, a mobile communication network, and a combination thereof.

The transmission device 106 is configured to receive or transmit data via a network. Examples of the network may include a wireless network provided by a communication provider of the terminal 10. In an example, the transmission device 106 includes a network interface controller (NIC). The NIC may be connected to other network devices via a base station, and thus communicating with the Internet. In an example, the transmission device 106 may be a radio frequency (RF) module. The RF module is configured to communicate with the Internet in a wireless way.

Figure 2:
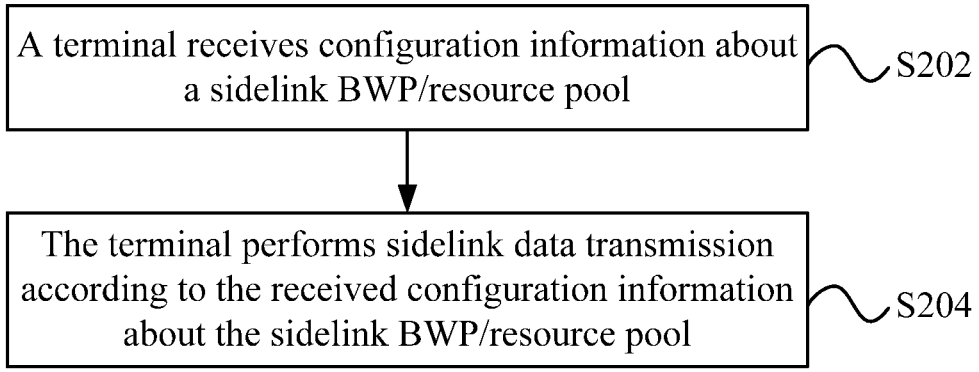
FIG. 2 is a flowchart of a method for resource configuration for a sidelink in Internet of vehicles according to an embodiment of the present disclosure.

The embodiment provides a method for resource configuration for a sidelink in Internet of vehicles executed in the terminal described above. FIG. 2 is a flowchart of a method for resource configuration for a sidelink in Internet of vehicles according to an embodiment of the present disclosure. As shown in FIG. 2, the method includes steps described below.

In step S202, a terminal receives configuration information about a sidelink BWP/resource pool.

In step S204, the terminal performs sidelink data transmission according to the received configuration information about the sidelink BWP/resource pool.

Through the step S102 and the step S204, the terminal may receive configuration information about the sidelink BWP/resource pool and perform the sidelink data transmission according to the configuration information about the sidelink BWP/resource pool, thus achieving the communication of Internet of vehicles based on a 5G sidelink, solving the problem that no communication of Internet of vehicles based on a 5G sidelink exists in the related art, and filling the blank in the related art.

It is to be noted that the configuration information about the sidelink BWP involved in the embodiments includes at least one of: a BWP index, BWP bandwidth, a BWP position, sub-carrier spacing, a cyclic prefix, or information about one or more of a destination identity (ID)/proximity based service per packet priority (ProSe Per Packet Priority, PPPP)/5G quality of service indication (5G QoS indication, 5QI)/quality of service flow identity (QFI)/packet delay budget (PDB)/priority.

Additionally, the configuration information about the sidelink BWP further includes sidelink BWP mapping information for indicating a mapping between a sub-carrier spacing and information about the destination ID/PPPP/5QI/QFI/PDB/priority.

In an alternative implementation of the embodiment, the step in which the terminal performs the sidelink data transmission according to the received configuration information about the sidelink BWP/resource pool may be performed in a manner as follows: the terminal determines a sidelink BWP and/or a sidelink resource pool for transmitting/receiving data according to the received configuration information about the sidelink BWP.

In another alternative implementation of the embodiment, before the terminal receives the configuration information about the sidelink BWP, the method in the embodiment may further include that the terminal transmits request information to a base station.

The request information includes at least one of: a V2X related system information (SI) request; a resource configuration request for sidelink synchronization, and/or sidelink discovery, and/or sidelink broadcast/groupcast communication, and/or sidelink unicast communication; a resource configuration request for an LTE sidelink; a transmission and/or reception interest indication for sidelink discovery; a transmission and/or reception interest indication for sidelink unicast communication; a transmission and/or reception interest indication for sidelink groupcast/broadcast communication; a sidelink unicast communication destination ID or a sidelink broadcast/groupcast communication destination ID; a PPPP/5QI/QFI/PDB/priority/packet error rate (PER)/guaranteed flow bit rate (GFBR)/policy-based routing (PBR)/address resolution protocol (ARP); or information about a sub-carrier spacing.

Each sidelink unicast communication destination ID includes at least one of: a unicast peer UE identity, a geographic position of a peer UE, and/or information about a beam index/beam direction.

Additionally, the information about the sidelink BWP/resource pool includes at least one of: a synchronization sidelink BWP, a broadcast sidelink BWP/resource pool, a sidelink groupcast BWP/resource pool, or a sidelink unicast BWP/resource pool.

In an exemplary implementation of the embodiment, the sidelink BWP/resource pool further includes an initial sidelink BWP/resource pool; where the initial sidelink BWP/resource pool is configured for establishing a sidelink unicast connection and/or for transmitting or receiving signaling for unicast data transmission resource configuration over the corresponding sidelink BWP/resource pool.

The unicast data transmission resource configuration includes the following: a first terminal transmits an available sidelink BWP and/or sidelink resource pool carrying V2X service information to a second terminal; and the first terminal receives the following information transmitted by the second terminal: acceptable V2X service information and/or configuration of a supported sidelink BWP/resource pool for transmission and/or reception.

In another alternative implementation of the embodiment, the method in the embodiment may further include step S106, or step S108, or step S110, or step S112, or step S114, or step S116, or step S118. In step S106, the terminal selects, according to the configuration information about the sidelink BWP and one of information about an available sub-carrier spacing or information about a destination ID/PPPP/5QI/QFI/PDB/priority corresponding to a data packet/a logical channel, a sidelink BWP/resource pool corresponding to the destination ID/PPPP/5QI/QFI/PDB/priority/available sub-carrier spacing to perform the data transmission. In S108, the terminal determines, according to information about a sub-carrier spacing/destination ID/PPPP/5QI/QFI/PDB/priority corresponding to a service which the terminal is interested in receiving, a sidelink BWP/resource pool to be monitored to or to be received. In step S110, the terminal receives an index of an activated sidelink (SL) BWP/resource pool indicated by a base station through radio resource control (RRC) signaling. In step S112, the terminal receives an index of an activated SL BWP/resource pool indicated by a base station through downlink control information (DCI). In step S114, the terminal receives transmission and/or reception SL BWP/resource pool information/index. In step S116, the terminal receives an index of an activated/switched SL BWP/resource pool included in sidelink control information (SCI). In step S118, the terminal receives configuration of an inactivity timer transmitted by a base station, and in a case where the inactivity timer times out, the terminal returns to an initial sidelink unicast BWP/resource pool.

It is to be noted that for an unpaired spectrum, a same Uu BWP is multiplexed for a sidelink BWP, paging and system information (SI); and/or for a scenario where a Uu uplink (UL) resource is used for a sidelink, a same sidelink BWP and a UL BWP are configured, or a sidelink BWP and a UL BWP are configured to be superposed in frequency domain; and/or for a scenario where a dedicated PC5 carrier is used for a sidelink, a sidelink BWP and a Uu BWP are independently configured.

The configuration information about the sidelink resource pool involved in the embodiment includes at least one of: a time-frequency domain position of a sidelink resource, time-frequency domain position information about an SCI resource, time-frequency domain position information about a data resource, information about a sub-carrier spacing, or a unicast/groupcast/broadcast indication.

The configuration information about the sidelink resource pool includes at least one of: configuration information about a transmission and/or reception resource pool of a serving cell or a UE-camped cell; configuration information about a transmission and/or reception resource pool of a neighboring cell/inter-frequency; configuration information about a sidelink transmission and/or reception resource pool corresponding to LTE and/or new radio (NR); configuration information about a transmission and/or reception resource pool for sidelink discovery; configuration information about a transmission and/or reception resource pool of sidelink communication; or configuration information about a sidelink transmission and/or reception resource pool of sidelink groupcast/broadcast/unicast.

In another alternative implementation of the embodiment, the method in the embodiment may further include the following steps, in step S120, the terminal receives sidelink bearer and/or logical channel configuration information transmitted by a base station, and in step S122, the terminal transmits a scheduling request (SR) for requesting a sidelink resource.

Before the terminal transmits the SR for requesting the sidelink resource, the terminal receives SR configuration information in at least one of the following manners: the terminal receives mapping information of a sidelink BWP resource and an SR resource, where the mapping information is configured by a base station; the terminal receives SR configuration which is transmitted by a base station and dedicated to requesting for a sidelink communication/discovery resource; a system reserved logical channel identify (LCD) value for indicating that a sidelink discovery and/or communication resource is requested; or the terminal receives a mapping between a V2X frequency and an SR resource, where the mapping is transmitted by a base station.

In another alternative implementation of the embodiment, the method in the embodiment may further include steps described below, in step S124, the terminal transmits a sidelink buffer status report (BSR) to a base station, where the sidelink BSR includes an index of a sub-carrier spacing or a sidelink BWP ID; in step S126, the terminal receives sidelink grant DCI transmitted by a base station, where the sidelink grant DCI includes an identity/index of a sidelink BWP and/or an identity/index of a sidelink transmission resource pool corresponding to a resource; in step S128, after the terminal receives the sidelink grant DCI transmitted by the base station, the terminal determines a sidelink transmission resource pool and/or a sidelink BWP corresponding to a sidelink grant; and in step S130, the terminal schedules, according to information about a sub-carrier spacing/destination ID/PPPP/5QI/QFI/PDB/priority corresponding to the determined sidelink transmission resource pool and/or sidelink BWP, data of a logical channel corresponding to the sub-carrier spacing/destination ID/PPPP/5QI/QFI/PDB/priority, assembles the data into a media access control protocol data unit (MAC PDU) and performs sidelink transmission.

In an exemplary implementation of the embodiment, the method in the embodiment may further include steps described below, in step S132, the terminal transmits sidelink V2X semi-persistent scheduling (SPS) assistance information to a base station; and in step S134, the terminal receives sidelink V2X SPS configuration transmitted by the base station.

The sidelink V2X SPS assistance information includes at least one of: an SPS type indication, a duration, a 5QI/QFI/PDB/delay/critical/Priority, or an available sub-carrier spacing.

The sidelink V2X SPS configuration includes at least one of: an SPS cycle, an offset, an identity/index of a sidelink BWP/resource pool corresponding to an SPS resource, a frequency domain resource position and size, or a validity period.

From the description the preceding implementations, it will be apparent to those skilled in the art that the method in the preceding embodiment may be implemented by software plus a necessary general-purpose hardware platform, or may of course be implemented by hardware. However, in many cases, the former implementation is adopted. Based on this understanding, the technical solution provided in the present application substantially, or the part contributing to the related art, may be embodied in the form of a software product. The computer software product is stored on a storage medium (such as a read-only memory (ROM)/random access memory (RAM), a magnetic disk or an optical disk) and includes several instructions for enabling a terminal (which may be a mobile phone, a computer, a server or a network device) to perform the method of each embodiment of the present application.

The present application will be described in detail below in conjunction with embodiments of the present application.

It is to be noted that the research scope of NR V2X includes sidelink unicast, sidelink groupcast and sidelink broadcast. Generally speaking, sidelink V2X communication may be divided into unicast, groupcast and broadcast. It is to be noted that sidelink unicast communication usually requires two UEs for performing the unicast communication to discover each other first, and then initiate unicast-based sidelink V2X communication. Generally speaking, sidelink discovery is also broadcast-based transmission. Subsequently, in the embodiment, sidelink broadcast generally refers to sidelink broadcast communication and sidelink discovery.

The present embodiment is based on 5G NR and provides system schemes for the NR-based sidelink resource pool configuration, sidelink BWP, sidelink resource request and resource allocation. The schemes will be described one by one in detail below.

1) Sidelink BWP and Configuration

A bandwidth part (BWP) is introduced to NR Uu and is a part of a cell bandwidth in frequency domain. A base station configures and notifies a UE of which BWP is activated for reception and transmission, and the reception and transmission bandwidth of the UE does not need to be as large as the cell bandwidth. The functions of BWPs are as follows: bandwidth resources can be flexibly adjusted, flexible scheduling is supported and electricity is saved. In consideration of the large bandwidth of NR, the BWP may also be considered to be introduced into an NR-based V2X sidelink, thus reducing the requirement on UE processing capacity and achieving the purpose of saving electricity.

Figure 3:
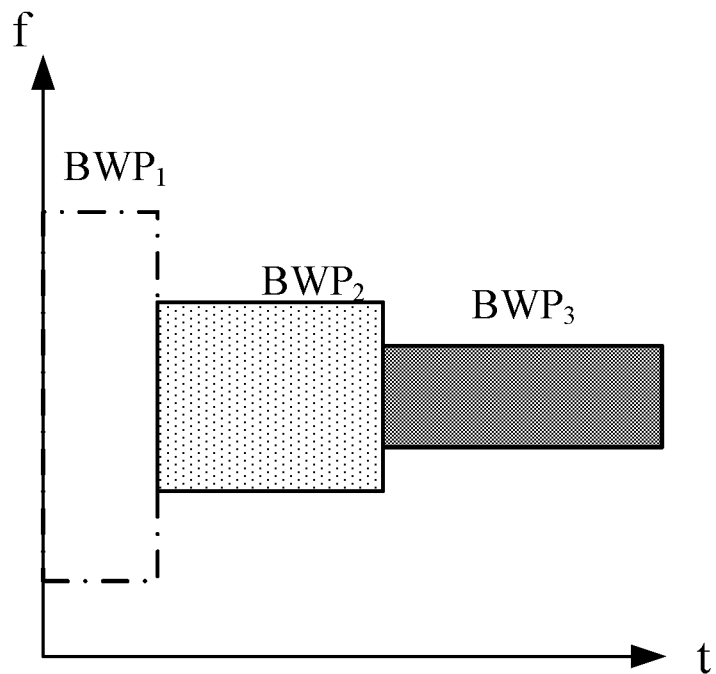
FIG. 3 is a schematic diagram of sidelink BWPs according to an embodiment of the present disclosure.

FIG. 3 is a schematic diagram of sidelink BWPs according to an embodiment of the present disclosure. As shown in FIG. 3, the UE receives sidelink BWP configuration information. Sidelink BWP configuration may be BWP configuration information transmitted by the base station or BWP information pre-configured by a system. The sidelink BWP configuration information includes a BWP index, a BWP bandwidth, a BWP position, a sub-carrier spacing, a cyclic prefix (CP), and the like.

a) Different Types of Services Corresponding to Different BWPs

Different BWPs may correspond to different bandwidths and sub-carrier spacings, and may correspond to different types of services. The UE receives sidelink BWP mapping information from the base station and selects a sidelink transmission/reception BWP of a sidelink.

The sidelink transmission BWP may be selected in several manners described below.

Figure 4:
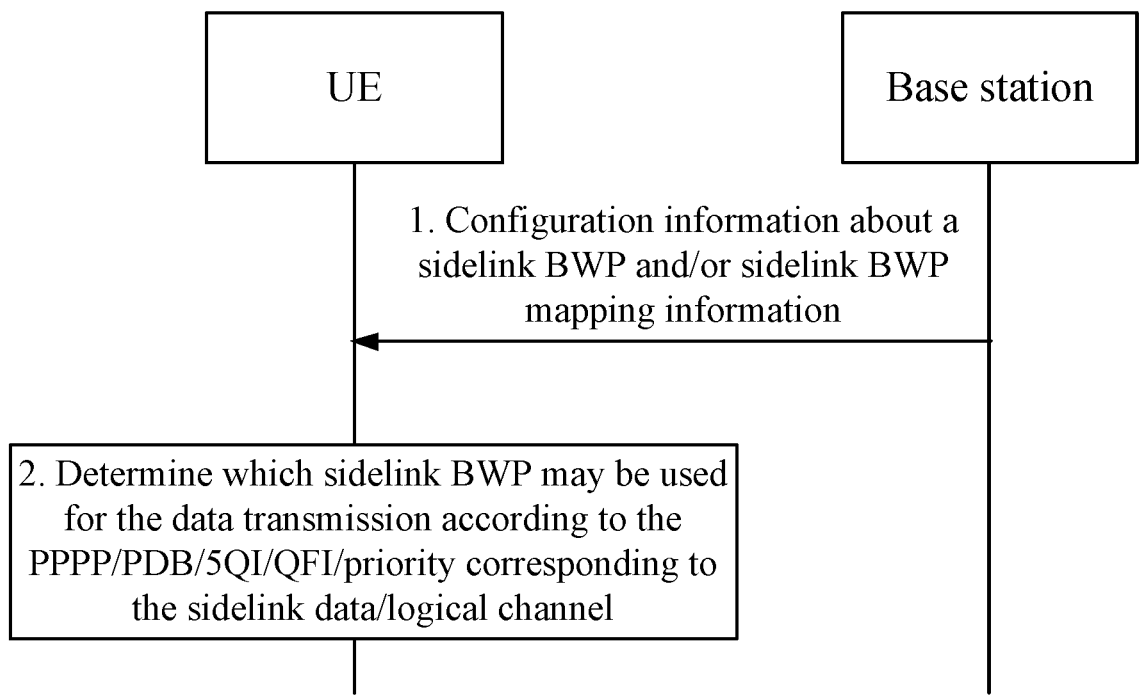
FIG. 4 is a flowchart of selecting a sidelink transmission BWP corresponding to a data packet or a logical channel according to an embodiment of the present disclosure.

The sidelink BWP mapping information may be a mapping between a sub-carrier spacing and a PPPP/5QI/QFI/PDB/priority. The UE determines a list of available sub-carrier spacings according to the sidelink BWP mapping information and information about the PPPP/5QI/QFI/PDB/priority corresponding to a sidelink data packet/logical channel. Then, according to information about a sub-carrier spacing included in the sidelink BWP configuration, the UE determines which sidelink BWP to use for transmitting the corresponding data packet/logical channel. FIG. 4 is a flowchart of selecting a sidelink transmission BWP corresponding to a data packet or a logical channel according to an embodiment of the present disclosure. As shown in FIG. 4, the sidelink BWP configuration information transmitted by the base station may include information about one or more of the PPPP/5QI/QFI/PDB/priority in addition to information such as the BWP index, BWP bandwidth, BWP position, sub-carrier spacing, and CP. The UE determines which sidelink BWP may be used to transmit the corresponding data packet/logical channel according to the information about the PPPP/5QI/QFI/PDB/priority corresponding to the sidelink data packet/logical channel and the information about one or more of the PPPP/5QI/QFI/PDB/priority included in the sidelink BWP configuration information.

Figure 5:
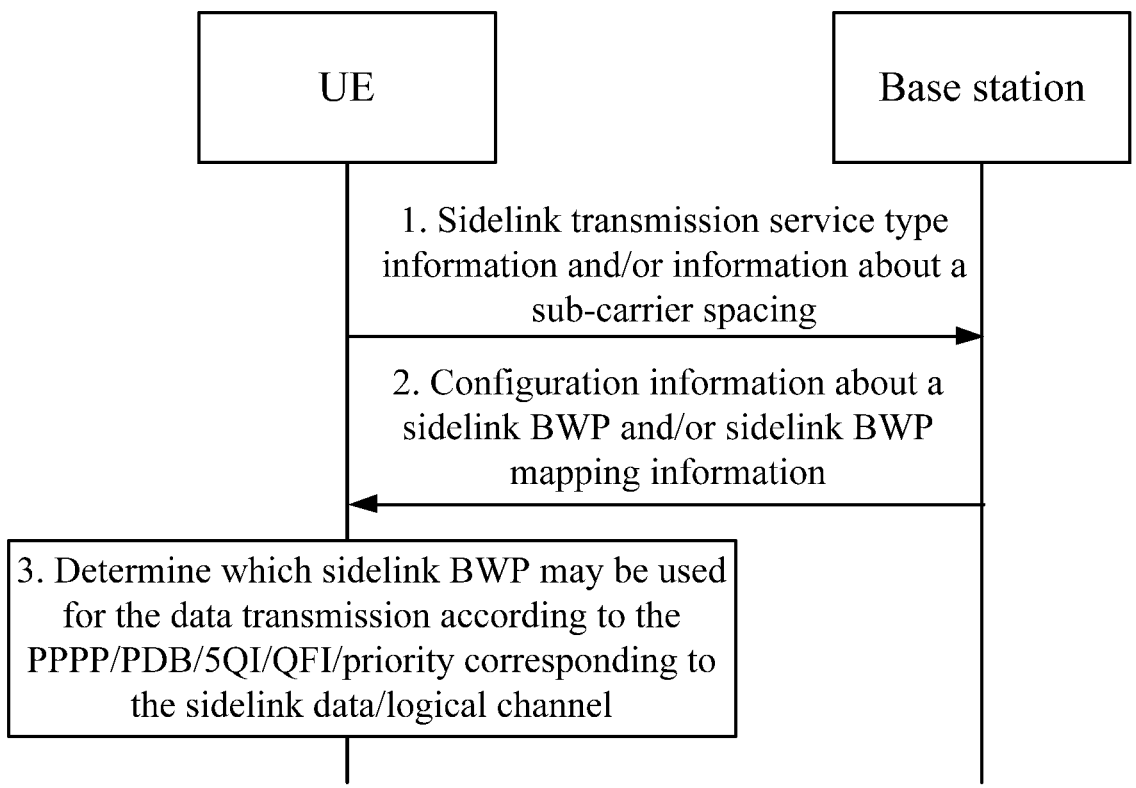
FIG. 5 is a flowchart in which a UE requests configuration of a sidelink transmission BWP according to an embodiment of the present disclosure.

The UE may transmit type information and/or information about a sub-carrier spacing of a sidelink V2X service to be transmitted to the base station, and the base station transmits the corresponding sidelink BWP configuration information and/or sidelink BWP mapping information to the UE. The type information of the V2X service includes information about the PPPP/5QI/QFI/PDB/priority corresponding to the V2X service transmitted by the UE. The UE may transmit information about one or more of the PPPP/5QI/QFI/PDB/priority to the base station corresponding to each destination ID transmitted by the UE to the base station and the information about one or more of the PPPP/5QI/QFI/PDB/priority respectively corresponds to different V2X sidelink services. FIG. 5 is a flowchart in which a UE requests configuration of a sidelink transmission BWP according to an embodiment of the present disclosure. As shown in FIG. 5, after receiving the request, the base station configures the corresponding sidelink transmission BWP and/or sidelink BWP mapping information for the UE. Additionally, the UE may also directly report an information list of sub-carrier spacings corresponding to the sidelink transmission service to the base station, and after receiving the request, the base station configures the corresponding sidelink transmission BWP for the UE. After receiving the preceding configuration information, the UE determines, according to the PPPP/PDB/5QI/QFI/priority or sub-carrier spacing corresponding to the sidelink data/logical channel, which sidelink BWP is used to transmit sidelink data. In an embodiment, the sidelink BWP configuration information which is transmitted by the base station to the UE through dedicated signaling includes index information of the sidelink transmission BWP.

The sidelink reception BWP may be selected in several manners described below.

(1) A higher layer of the UE notifies a PPPP/5QI/QFI/PDB/priority corresponding to the sidelink service to be received, and the UE determines, according to the sidelink BWP configuration information and/or sidelink BWP mapping information mentioned above, the sidelink BWPs on which data is received.

(2) A higher layer of the UE notifies the list of available sub-carrier spacings corresponding to the sidelink service to be received, and the UE determines, according to the information about the sub-carrier spacing included in the sidelink BWP configuration information, the sidelink BWPs on which data is received.

Figure 6:
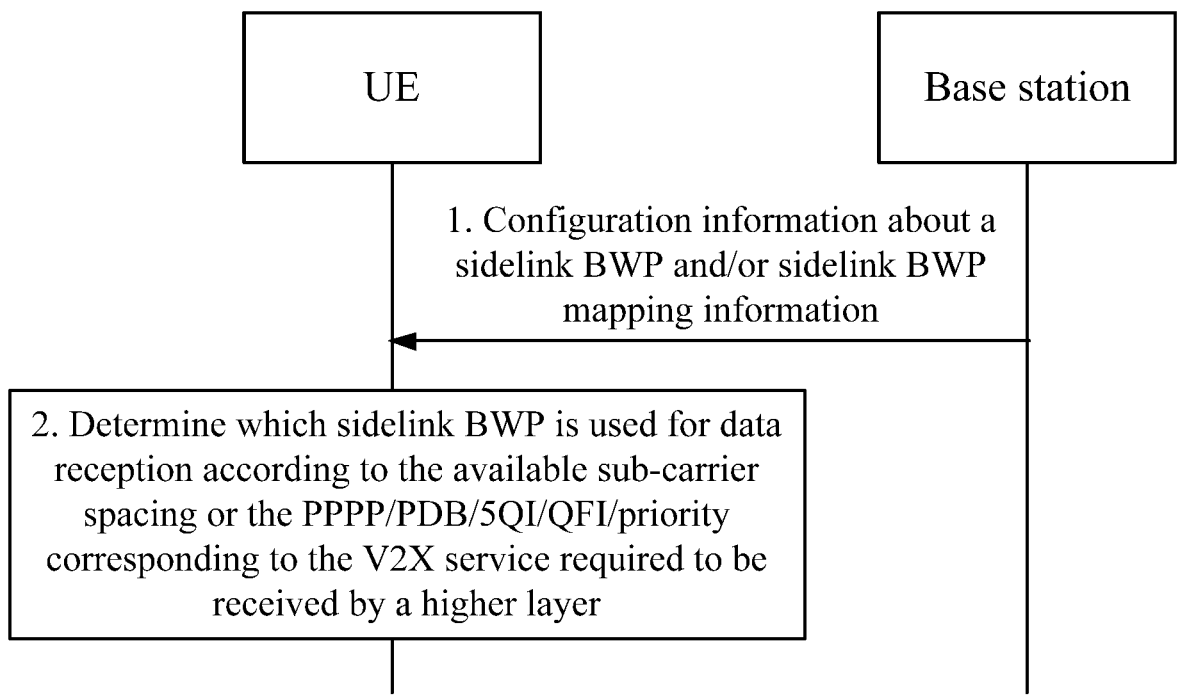
FIG. 6 is a flowchart of selecting a sidelink reception BWP corresponding to a data packet or a logical channel according to an embodiment of the present disclosure.

FIG. 6 is a flowchart of selecting a sidelink reception BWP corresponding to a data packet or a logical channel according to an embodiment of the present disclosure. As shown in FIG. 6, the UE may transmit the type information and/or information about a sub-carrier spacing of a sidelink V2X service to be received to the base station, and the base station transmits the corresponding sidelink BWP configuration information and/or sidelink BWP mapping information to the UE. The type information of the V2X service includes information about the PPPP/5QI/QFI/PDB/priority corresponding to the V2X service received by the UE. After receiving the request, the base station configures the corresponding sidelink reception BWP and/or sidelink BWP mapping information for the UE. Additionally, the UE may also directly report an information list of sub-carrier spacings corresponding to the sidelink reception service to the base station, and after receiving the request, the base station configures the corresponding sidelink reception BWP for the UE. After receiving the preceding configuration information, the UE performs the sidelink data transmission on the corresponding sidelink BWP. In an embodiment, the sidelink BWP configuration information which is transmitted by the base station to the UE through dedicated signaling includes index information of the sidelink reception BWP.

Figure 7:
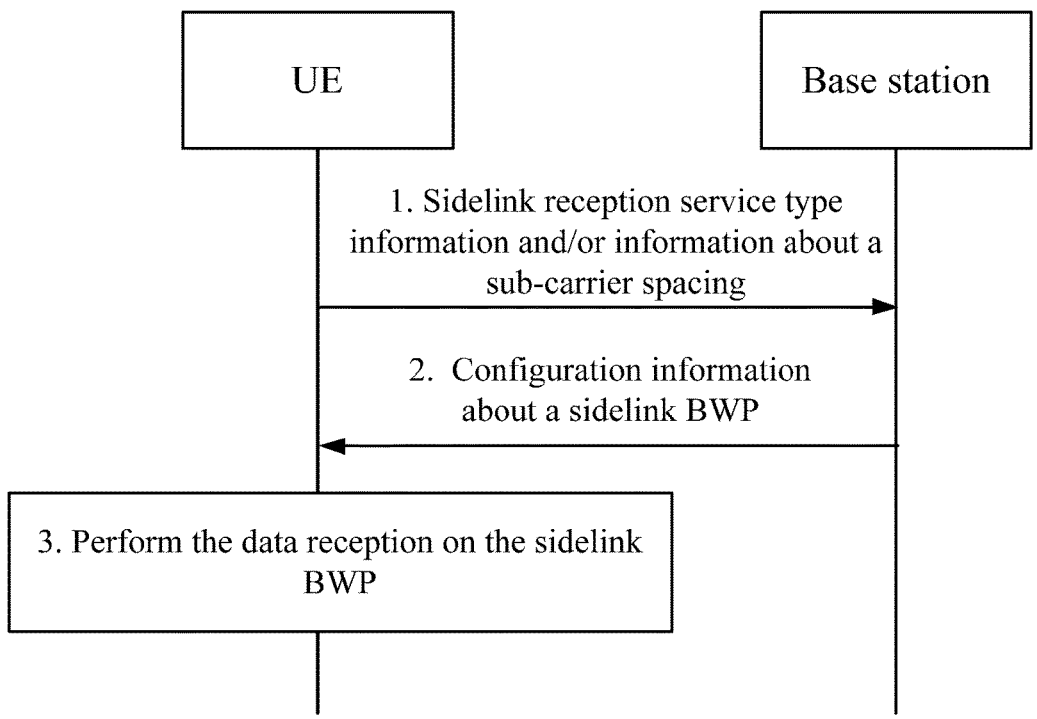
FIG. 7 is a flowchart in which a UE requests configuration of a sidelink reception BWP according to an embodiment of the present disclosure.

FIG. 7 is a flowchart in which a UE requests configuration of a sidelink reception BWP according to an embodiment of the present disclosure. As shown in FIG. 7, for information about a PPPP/5QI/QFI/PDB/priority associated with each sidelink BWP, one or more corresponding PPPPs/PDBs/priorities are provided, and additionally, a threshold of the PPPP/PDB/priority may also be considered to be provided. The sidelink BWP may be used when the priority of the data packet or logical channel is higher than the priority corresponding to the threshold, or when the PDB corresponding to the data packet or logical channel is lower than the PDB corresponding to the threshold.

Additionally, if the sidelink logical channel of the UE is pre-configured with the list information about the available sub-carrier spacing, the UE may determine which sidelink BWP may be used for transmitting the corresponding data packet/logical channel according to the information about the sub-carrier spacing included in the sidelink BWP configuration.

The UE may acquire the sidelink BWP and/or sidelink BWP mapping information through the base station or acquire the sidelink BWP configuration information and/or sidelink BWP mapping information through pre-configuration to perform the selection of the sidelink transmission and/or reception BWP.

b) Unicast and Broadcast/Groupcast Corresponding to Different BWPs

A synchronization sidelink BWP may be considered to be introduced into an NR sidelink and may be used for transmitting and receiving sidelink synchronization signals. Additionally, a broadcast sidelink BWP may be configured for the broadcast-based sidelink transmission such as sidelink discovery, sidelink groupcast, or sidelink broadcast. The synchronization sidelink BWP is likely to be the same as the broadcast sidelink BWP.

Figure 8:
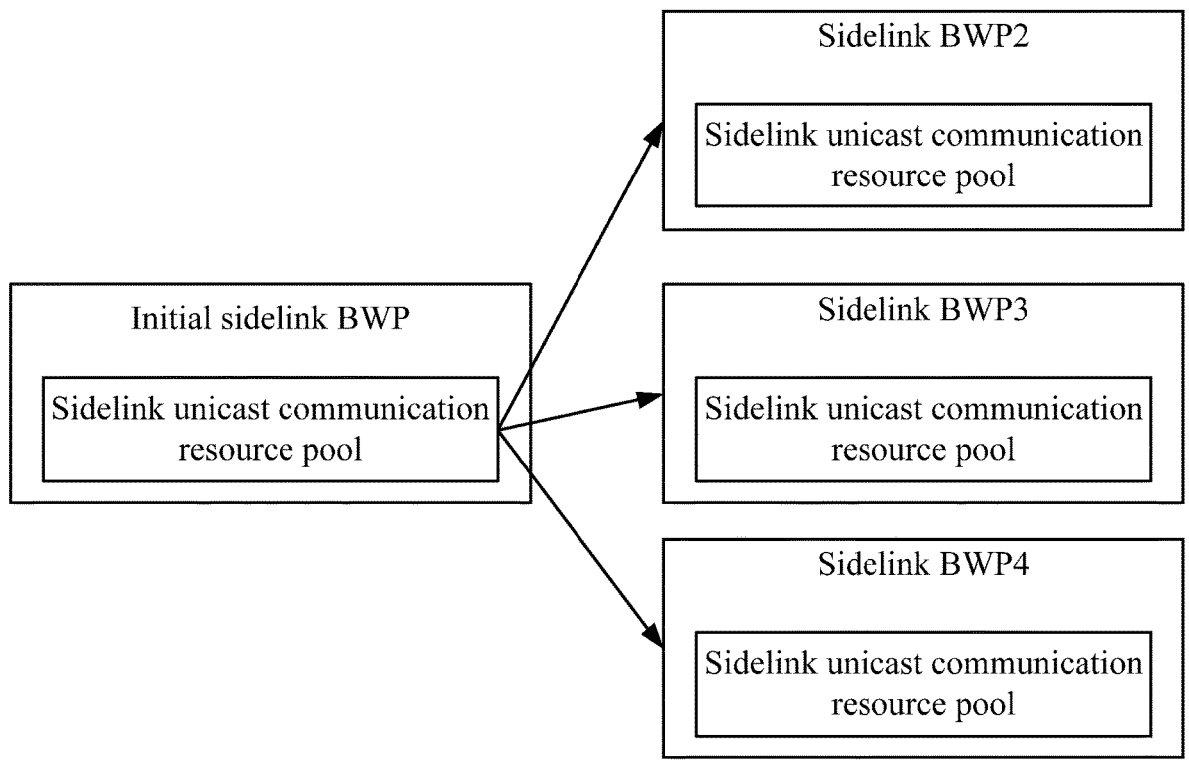
FIG. 8 is a schematic diagram of an initial BWP and common BWPs according to an embodiment of the present disclosure.

FIG. 8 is a schematic diagram of an initial BWP and common BWPs according to an embodiment of the present disclosure. As shown in FIG. 8, two types of BWPs are configured, one type is the initial BWP and the other type is the common BWP. A UE interested in the sidelink unicast communication may transmit and receive PC5 connection establishment related information on the initial sidelink BWP to establish a PC5 connection. In a PC5 connection establishment process or a PC5 configuration process, a UE node pair may negotiate the corresponding sidelink BWP and/or corresponding sidelink resource pool for transmitting/receiving subsequent sidelink unicast communication data. Assuming that BWP3 is adopted after the negotiation, the UE node pair merely needs to transmit and receive data packets on the BWP3. Assuming that new V2X service data needs to be transmitted between the UE node pair, the UE node pair may further use the initial BWP or BWP3 for negotiation, and determine, according to the quality of service (QoS) requirements of the new V2X service, whether a new sidelink BWP needs to be configured for transmitting and receiving unicast data.

Figure 9:
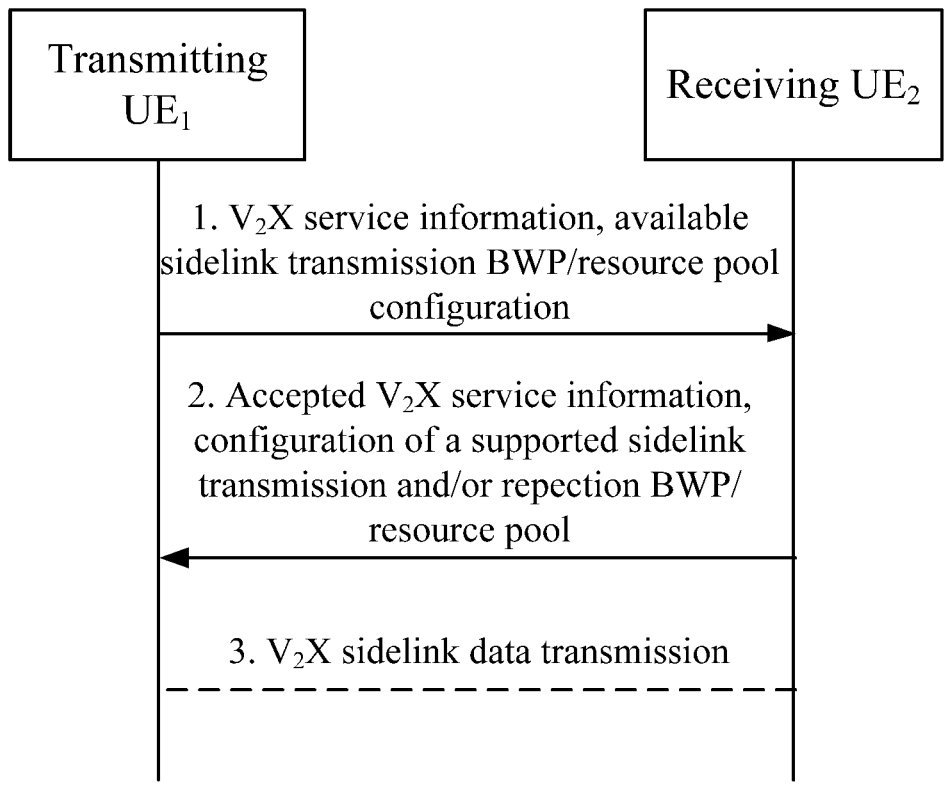
FIG. 9 is a flowchart in which UEs in unicast communication negotiate a sidelink BWP and/or resource pool for sidelink data transmission according to an embodiment of the present disclosure.

FIG. 9 is a flowchart in which UEs in the unicast communication negotiate a sidelink BWP and/or resource pool for sidelink data transmission according to an embodiment of the present disclosure. As shown in FIG. 9, UE1 and UE2 receive configuration information about the initial sidelink BWP of the unicast communication, which is transmitted by the base station or is pre-configured. Assuming that UE1 discovers UE2 and initiates PC5 connection establishment with UE2, UE1 may transmit PC5 connection establishment request information on the initial sidelink BWP. UE2 interested in the sidelink unicast communication monitors to the initial sidelink BWP and receives a PC5 connection establishment request transmitted by UE1, and then UE2 transmits a PC5 connection establishment response message.

UE1 may transmit sidelink configuration information to UE2. The configuration information includes at least one of: V2X service information of data to be transmitted or configuration information about an available sidelink BWP/resource pool. The service information of the data to be transmitted includes at least one of: QOS parameters (such as a PPPP/5QI/QFI/PDB/priority, and a GFBR), service data adaptation protocol (SDAP) configuration information (mapping from the QFI to a data resource bearer (DRB) between the terminal and the base station, whether an SDAP sub-header exists), radio link control (RLC) configuration information (acknowledged mode (AM)/unacknowledged mode (UM), bidirectional or unidirectional, whether out-of-order delivery exists, a t-assembly timer, an RLC serial number (SN) length, retransmit, poll, etc.), packet data convergence protocol (PDCP) configuration information (a PDCP serial number (SN) length, a discard timer, a t-reordering timer, a data split threshold, integrity protection, maxCID, etc.), logical channel configuration information (a logical channel identity, a priority, a PBR, allowSCS), MAC configuration information, or the like. The configuration information about the available sidelink BWP/resource pool includes the following information such as the CP, the sub-carrier spacing, the BWP position, the BWP bandwidth and/or the BWP identity of the sidelink BWP.

After receiving the sidelink configuration over a PC5 interface, UE2 transmits receivable V2X service information and/or configuration of the supported sidelink transmission and/or reception BWP/resource pool to the UE1. UE2 determines, according to capabilities of the UE2 and the sidelink BWP/resource pool configuration configured by a serving cell, which sidelink BWP/resource pool configuration transmitted by UE1 may be supported. Additionally, UE2 may also establish a corresponding sidelink bearer and/or logical channel according to the V2X service information transmitted by UE1. If some sidelink bearers and/or logical channels fail to be established or some QoS flows fail to be supported, UE2 may also feed back a list of successfully and/or unsuccessfully established sidelink bearers/logical channels/QoS flows to UE1. After receiving sidelink configuration feedback information of UE2, UE1 may start initiating V2X sidelink data transmission.

It is to be noted that the sidelink configuration information may multiplex a same signaling process with the PC5 connection establishment, or use a different signaling process from the PC5 connection establishment. Further, when UE1 initiates the sidelink unicast communication transmission, UE1 may also transmit V2X service information (which may include parameter information about a QoS flow, such as a PDB/PER/priority/PBR, etc.) to a serving base station. After receiving the information, the serving base station transmits supportable QoS flow information and/or sidelink bearer/logical channel configuration information. Alternatively, after receiving the sidelink configuration information transmitted by UE1, UE2 may also transmit V2X service information (which may include parameter information about a QoS flow, such as a PDB/PER/priority/PBR, etc.) to the serving base station. After receiving the information, the serving base station transmits supportable QoS flow information and/or sidelink bearer/logical channel configuration information. According to such information, UE2 feeds back a list of successfully and/or unsuccessfully established sidelink bearers/logical channels/QoS flows to UE1.

c) Activation/Deactivation and Switching of a Sidelink BWP

For a sidelink, the UE activates merely one sidelink BWP for sidelink transmission. However, the UE may be interested in receiving different types of V2X services, so the UE may monitor to/receive multiple sidelink BWPs at the same time. Which SL BWPs to be monitored to is determined according to a service which the UE is interested in. For example, the UE determines which SL BWPs need to be monitored to according to an available SCS list corresponding to each service. Additionally, the UE interested in the unicast communication may merely monitor to an initial unicast SL BWP, and then determine, according to sidelink configuration or a PC5 signaling indication, a unicast SL BWP to be monitored to.

For activation and switching of an SL BWP, the switching manners described below may be considered.

(1) Over a Uu interface, the UE receives a UE activated SL BWP and/or an index of an SL BWP indicated by the base station through RRC signaling.

(2) Over a Uu interface, the UE receives a transmitting UE activated SL BWP and/or an index of an SL BWP indicated by the base station through DCI.

(3) In an LCP process, the transmitting UE selects an available SL BWP according to the information about the PPPP/PDB/priority/5QI, QFI/sub-carrier spacing of the logical channel corresponding to the data to be transmitted. Switching and/or activation of the SL BWP is initiated when necessary.

(4) Over the PC5 interface, the UE node transmits and/or receives information about an activated SL transmission and/or reception BWP through PC5 signaling.

(5) Over the PC5 interface, the UE may carry the index of the activated SL BWP in SCI. The peer UE is instructed to switch to a new SL reception BWP.

The UE receives inactivity timer configuration from the base station. If the UE in unicast does not receive, on a certain unicast SL BWP within a period of time, the data transmitted to the UE in unicast itself, the inactivity timer times out, and the UE may fall back to the initial unicast BWP.

During the switching of an SL BWP, for example, when the UE switches from SL BWP1 to SL BWP2, the UE adopts an autonomous resource selection manner, the sensing result on the resource pool corresponding to SL BWP2 is not available at this time, and the UE may first use an autonomous random selection resource pool on SL BWP2.

d) Interaction Between a Uu BWP and a Sidelink BWP

For an unpaired spectrum, the same Uu BWP of paging and SI may be multiplexed as the sidelink discovery/sidelink broadcast/sidelink groupcast/initial sidelink unicast BWP, thereby enabling the UE to receive sidelink information and system information/paging information on the unified BWP.

For a scenario where a Uu UL resource is used for a sidelink, a sidelink BWP and a UL BWP are configured to be the same, or a sidelink BWP and a UL BWP are configured to be superposed in frequency domain as much as possible.

For a scenario where a dedicated PC5 carrier is used for a sidelink, a sidelink BWP and a Uu BWP are independently configured.

2) Sidelink Resource Pool Configuration

Configuration information about a sidelink resource pool includes configuration information about a sidelink transmission resource pool and configuration information about a sidelink reception resource pool. The sidelink resource pool configuration indicates the time-frequency domain position of a sidelink resource. The sidelink resource pool information further provides resource time-frequency domain position information of SCI and data, and/or information about a sub-carrier spacing. For example, time domain information may include an sl slot bitmap, while frequency domain information may be indicated by an SL BWP or by an independent starting resource block (RB) position, a number of sub-channels/RBs, etc. For one SL BWP, different time domain bitmaps may be configured in frequency domain and corresponding to different sidelink resource pools. Additionally, within one SL BWP, frequency domain may be further subdivided, corresponding to different sidelink resource pools.

Different sidelink BWPs are associated with different numerology (corresponding to different sub-carrier spacings), so BWP-based V2X sidelink resource pools are also associated with different numerology and may be used for supporting different types of V2X services.

The information described below may be included in the sidelink resource pool configuration.

(1) The Cell, a Neighboring Cell, No Coverage

The configuration information about the sidelink resource pool, which is received by the UE from the base station, includes the transmission and/or reception resource pool configuration of the cell. Additionally, the UE may also receive the transmission and/or reception resource pool configuration of a neighboring cell and the transmission and/or reception resource pool configuration of a cross-carrier from the base station. Besides, the UE may pre-configure the transmission and reception resource pools on each carrier. When the UE is in a non-coverage state, the pre-configured resource pools may be used for sidelink transmission and reception.

(2) LTE and NR

In the scenario where LTE and NR coexist, the UE receives the sidelink transmission and/or reception resource pool configuration corresponding to LTE and/or NR from the base station. The corresponding resource pool information may carry version information or radio access technology (RAT) information.

(3) Discovery and Communication

Sidelink discovery and sidelink communication correspond to different sidelink transmission and/or reception resource pools. The UE receives the sidelink transmission and/or reception resource pool configuration corresponding to sidelink discovery and/or sidelink communication from the base station.

(4) Unicast and Broadcast

In the sidelink communication, the sidelink groupcast and/or broadcast may correspond to transmission and/or reception resource pools different from transmission and/or reception resource pools of the sidelink unicast. For the sidelink unicast, the resource pool configuration includes resources corresponding to hybrid automatic repeat request (HARQ) acknowledgment (ACK)/non-acknowledgment (NACK) transmission. For the sidelink unicast, the resource pool configuration includes the initial transmission and/or reception resource pool, as well as other transmission and/or reception resource pools. The initial transmission and/or reception resource may correspond to a sidelink initial BWP. For the sidelink broadcast, the resource pool configuration may include resource configuration and a cycle of beam sweeping. The UE receives the resource pool configuration information of sidelink groupcast/broadcast and/or sidelink unicast from the base station. The corresponding resource pool configuration information may include a communication mode indication, such as unicast, groupcast, or broadcast. It is to be noted that the UE may receive configuration information about a sidelink resource pool of a neighboring cell from the base station. The configuration information about the sidelink resource pool of the neighboring cell may include sidelink groupcast/broadcast resource pool information of the neighboring cell and/or transmission/reception resource pool information corresponding to the initial sidelink unicast BWP.

Figure 10:
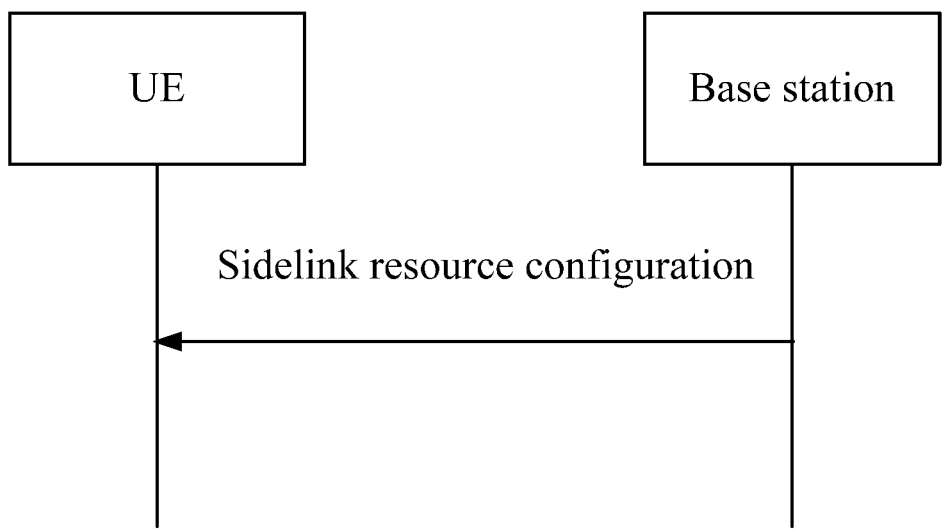
FIG. 10 is a flowchart in which a UE receives sidelink resource configuration from a base station according to an embodiment of the present disclosure.

FIG. 10 is a flowchart in which a UE receives sidelink resource configuration from a base station according to an embodiment of the present disclosure. As shown in FIG. 10, for a UE in an idle state or an inactive state, the UE receives V2X resource pool information transmitted by the base station in a broadcast manner. If V2X related SI information does not exist in the broadcast message, and if an SI request random access channel (RACH) resource is indicated in SIB1, the UE requests the V2X related SI by using MSG1; and if the SI request RACH resource is not configured in SIB1, the UE requests the V2X related SI by using MSG3 (RRCSystemInfoRequest). The base station transmits the V2X related SI after reception. Additionally, a V2X support indication may be included in SIB1 transmitted by the base station. If such indication exists and no V2X sidelink resource allocation information is broadcast, the UE enters an RRC connection state to request the resource.

Figure 11:
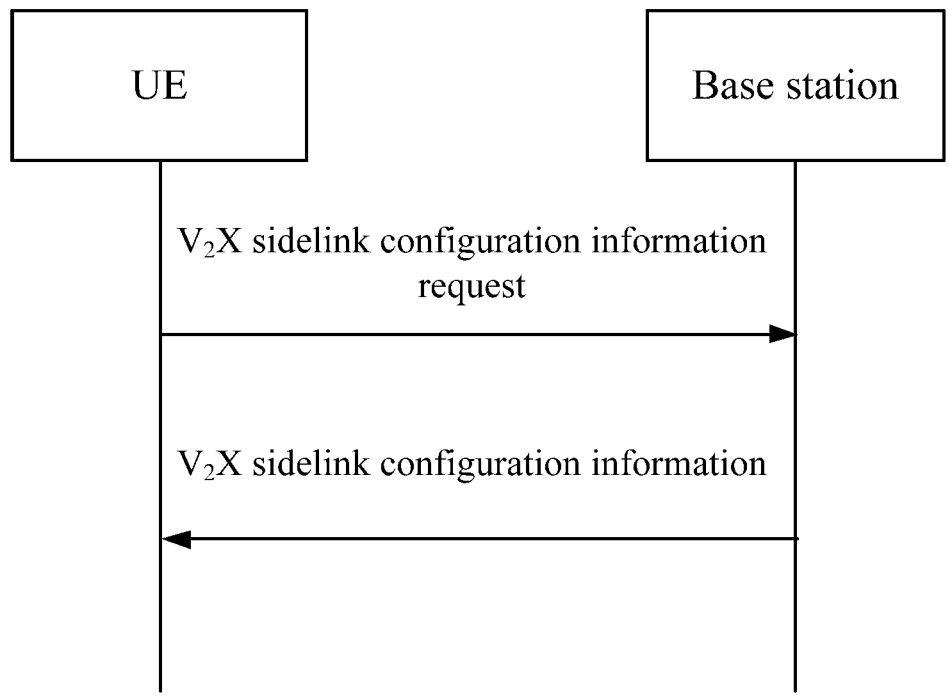
FIG. 11 is a flowchart in which a UE requests V2X sidelink configuration information according to an embodiment of the present disclosure.

Further, FIG. 11 is a flowchart in which a UE requests V2X sidelink configuration information according to an embodiment of the present disclosure. As shown in FIG. 11, in consideration of the various V2X resource pool types described above, the UE does not necessarily need to acquire all V2X sidelink related resource pool information. The UE transmits a sidelink configuration information request to the base station, and the sidelink configuration information request includes indication information of sidelink synchronization, and/or sidelink discovery, and/or sidelink broadcast/groupcast communication, and/or sidelink unicast communication. The base station transmits the corresponding sidelink configuration information to the UE.

The V2X UE in an RRC connected state may also transmit a V2X sidelink configuration request to the base station. The base station configures a transmission and/or reception resource pool corresponding to base station scheduling resource allocation (Mode3) and/or a transmission and/or reception resource pool corresponding to autonomous resource allocation (Mode4) for the UE through dedicated signaling.

The V2X sidelink configuration request transmitted by the V2X UE may include any combination of the following information: a transmission and/or reception interest indication for sidelink discovery; a transmission and/or reception interest indication for sidelink unicast communication; a transmission and/or reception interest indication for sidelink groupcast/broadcast communication, a sidelink unicast communication destination ID and a sidelink broadcast/groupcast communication destination ID. For each sidelink unicast communication destination ID and sidelink broadcast/groupcast communication destination ID, the V2X sidelink configuration request may also include service type information such as the 5QI, PDB, PER/PPPR, priority/PPPP, GFBR/PBR, ARP, etc. For each sidelink unicast communication destination ID, the V2X sidelink configuration request may also include at least one of: a unicast peer UE identity, a geographic position of a peer UE, and/or information about a beam index/beam direction.

After receiving the V2X sidelink configuration request transmitted by the V2X UE in the connected state, the base station transmits the V2X sidelink resource configuration to the UE. The V2X sidelink resource configuration includes Mode3 and/or Mode4 resource pool configuration information.

For NR V2X, in order to better support a variety of different V2X service types, the V2X sidelink resource configuration transmitted by the base station to the UE may include mode 3 and mode 4 resource pools at the same time. The UE may more flexibly select which type of resource to use according to service requirements. For example, the UE may select mode 3 resources for a service requiring higher reliability. For mode 4 random resource pools, each pool may be associated with one or more latency requirement levels/ranges (numerology representation), facilitating services having different latency requirements to select different resource pools. Additionally, the base station may also configure sidelink resource pools of different modes on different carriers, such as a mode3 transmission resource pool configured on carrier 1 and a mode4 transmission resource pool configured on carrier 2. Further, the sidelink configuration information received by the V2X UE interested in unicast reception may also include an initial sidelink unicast reception resource pool or a reception resource pool based on an initial sidelink unicast BWP.

In addition to the preceding configuration information about the sidelink resource pool, the V2X sidelink configuration received by the UE from the base station may also include sidelink bearer and/or logical channel configuration information, which may include any combination of the following information: QoS parameters (such as a PPPP/5QI/QFI/PDB/priority and GFBR), SDAP configuration information (mapping from the QFI to a DRB, whether an SDAP sub-header exists), RLC configuration information (AM/UM, bidirectional or unidirectional, whether out-of-order delivery exists, a t-assembly timer, an RLC SN length, retransmit, poll, etc.), PDCP configuration information (a PDCP SN length, a discard timer, a t-reordering timer, a data split threshold, integrity protection, a maxCID, etc.), logical channel configuration information (a logical channel identity, a priority, a PBR, allowSCS), MAC configuration information, and the like. Available sidelink BWP/resource pool configuration information includes the CP, the sub-carrier spacing, the BWP position, the BWP bandwidth and/or the BWP identity of the sidelink BWP, etc. After receiving the preceding configuration, the UE may configure the sidelink bearer and/or the logical channel accordingly.

The UE may select a resource pool after receiving the transmission and/or reception resource pool configuration transmitted by the base station or pre-configured by the system, and the selection method is as described below.

a) The UE may be interested in receiving different types of V2X services, so the UE may monitor to/receive multiple sidelink BWPs/resource pools at the same time. Which SL BWPs/resource pools to be monitored to are determined according to the service which the UE is interested in. For example, the UE determines which SL BWPs/reception resource pools need to be monitored to according to service type information/a list of available SCSs corresponding to each service. The UE interested in the unicast communication may merely monitor to an initial unicast SL BWP or an initial unicast reception resource pool, and then determine, according to the sidelink configuration transmitted by the base station or a PC5 signaling indication transmitted by the peer UE, other unicast SL BWPs or unicast reception resource pools to be monitored to.

b) For the UE which is in the idle state or the inactive state or in the connected state and decides to adopt the autonomous resource allocation, after receiving multiple sidelink transmission resource pools transmitted by the base station or pre-configured by the system, the UE selects the sidelink BWP/sidelink transmission resource pool of the corresponding SCS according to a list of available sub-carrier spacings (SCSs) corresponding to the logical channel of the service data to be transmitted. If multiple available sidelink BWPs/sidelink transmission resource pools exist, the UE further selects the first sidelink transmission resource pool, or selects a sidelink transmission resource pool having the smallest CBR value, or arbitrarily selects one sidelink transmission resource pool.

c) For the UE in the connected state, a buffer state of the sidelink bearer/logical channel may be reported to the base station, and the base station allocates sidelink resources for the UE. A sidelink grant transmitted by the base station to the UE includes an index of a sidelink BWP and/or an index of a sidelink transmission resource pool. After receiving the sidelink grant, the UE determines data of which logical channels is scheduled to be transmitted according to the QoS information (such as a PPPP/PDB/PPPR/5QI/SCS) corresponding to the index of the sidelink BWP and/or the sidelink transmission resource pool and according to the QoS parameters (PPPP/PDB/PPPR/5QI/SCS) corresponding to the sidelink bearer/logical channel.

d) For the sidelink unicast communication, the UE initiating the unicast communication transmits V2X sidelink BWP/sidelink transmission resource pool information to the peer UE. After receiving the information, the peer UE monitors to the sidelink reception resource pool corresponding to the V2X sidelink BWP/sidelink transmission resource pool information.

3) Resource Request and Allocation of a UE in a Connected State

For the UE adopting the manner in which the base station schedules resource allocation, the sidelink resource request and allocation may be divided into steps described below.

(1) The UE Transmits an SR.

The UE transmits an SR for requesting a sidelink communication resource. In order to enable the base station to distinguish between sidelink communication and Uu communication, the following SR resource configuration and SR transmission methods may be adopted: a) the base station configures a mapping between SR configuration and a sidelink BWP/resource; and when the UE uses a corresponding SR resource to transmit the SR, the base station knows that the sidelink communication resource is requested; b) SR configuration dedicated to requesting the sidelink communication resource is configured for the UE; c) an uplink reserved LCID value is used, and the LCID value is specifically used for indicating a request for the sidelink communication resource; and d) a mapping between SR configuration and a V2X frequency reported in sidelinkUEInformation is configured.

(2) The UE Transmits a BSR.

The sidelink BSR transmitted by the UE includes a logical channel group identity, a buffer size, and a sidelink communication destination ID/index. Additionally, the sidelink BSR transmitted by the UE may also carry an index of an SCS/SL BWP id. The index of the SCS/SL BWP id may notify the base station of the type of sub-carrier spacing or SL BWP frequency domain information required for data transmission of the UE.

(3) The Base Station Transmits a Sidelink Grant.

The base station configures multiple mode 3 sidelink transmission resource pools and/or sidelink BWPs for the UE, so the base station includes pool ids and/or bwp ids in the transmitted sidelink grant DCI so as to indicate the sidelink transmission resource pools and/or sidelink BWPs corresponding to the DCI resource.

The UE performs scheduling, assembly the MAC PDU and transmitting. After receiving the sidelink grant, the UE determines the sidelink transmission resource pools and/or sidelink BWPs corresponding to the resource and determines the sub-carrier spacing or QoS parameter (a PPP/PDB/PER/5QI) corresponding to the resource pool or sidelink BWP. Then, the UE schedules data of the logical channel corresponding to the sub-carrier spacing or QoS parameter, assembles the data into the MAC PDU, and transmits the data through a physical layer.

For the sidelink resource allocation, the support for sidelink resource preemption may also be considered. For example, the base station may preempt a sidelink resource which is already allocated for UE1 and then allocate the preempted resource to UE2 for transmitting delay critical V2X data. In order to support such function, the sidelink configuration information received by the UE from the base station may include an SL-INT-RNTI. The UE monitors to the SL-INT-RNTI on a physical downlink control channel (PDCCH). If receiving a sidelink transmission interrupt indication, the UE considers that no available information exists at a resource position indicated by the SL-INT-RNTI.

4) Semi-Persistent Resource Configuration

The UE may need to transmit multiple types of V2X messages at the same time, and the cycles, time of arrival and sizes of various messages are different. In order to reduce latency and make better use of resources, R14 V2X supports multiple SPS processes. The UE needs to report assistance information (a packet arrival cycle, a packet arrival offset, a PPPP, a maximum MAC PDU size) to help the base station configure and activate an appropriate SPS process. The base station uses DCI format 5A scrambled through the SL-V-SPS-RNTI to activate or release the SPS process indicated through an SL SPS configuration index field.

A V2X service, like a ultra-reliable low latency communication (URLLC) service, has the requirements of low latency and high reliability. It may be considered to configure sidelink communication SPS transmission resources through RRC signaling (Type 1), thus reducing latency. It is necessary for an NR sidelink to support multiple type 1 configuration/SPS processes since V2X messages have different message types, message cycles, time of arrival, and packet sizes. Additionally, it is also possible to consider the mechanism of multiplexing DCI for SPS activation and deactivation (type2).

Alternatively, the UE transmits sidelink V2X SPS assistance information to the base station, and the UE receives the sidelink V2X SPS configuration transmitted by the base station. Further, the sidelink V2X SPS assistance information may include any combination of the following information: an SPS type indication (type1 or type2), a QoS indication (a 5QI/PDB/delay critical/PER), an available sub-carrier spacing, and the like. The base station configures an SPS resource of type 1 or type 2 for the UE according to the assistance information. The sidelink V2X SPS configuration includes the SPS cycle, offset, SL transmission resource pool (index) and/or SL BWP (index) corresponding to the SPS resource, a frequency domain resource position and size, etc.

For the sidelink SPS resource, when the UE no longer uses the SPS resource to transmit data, the base station cannot know the case, and the deactivation/release of the SL SPS needs to be considered. The following methods may be considered: 1) the UE estimates an approximate duration/number of cycles of type 1 resources required for this type of data, reports the duration in UE assistance information, and a next generation base station (gNB) configures type 1 resource release or validity period according to this information; and 2) when the UE no longer needs certain type 1 resource configuration (for example, no data transmission for N consecutive times), the UE releases the type 1 resource configuration and notifies the gNB (of the index of the released type 1 configuration).

5) Access Control

Unified access control is provided in NR and is implemented through the access category and access identity. The access identity is configured on an SIM card when the UE signs a contract. Access identities 11 to 15 are special access classes, and access identities 3 to 10 are reserved values. The access category is defined by integrating a UE situation and the access attempt. Access categories 8 to 31 are reserved standardized access categories, while access categories 32 to 63 are reserved for an operator to define independently.

The V2X service has the requirements of high reliability and low latency. For an access initiated for the V2X sidelink/Uu communication, the access may be controlled by defining the access identity or access category (SA1 definition) and configuring barring parameters. A UE non-access stratum (NAS) determines the access category and access identity for the access attempt. If the access attempt is not subjected to barring, the UE NAS performs a mapping from the access attempt (associated access category and access identity(ies)) to the establishment cause and provides the mapping to the RRC so as to be included in a connection request, thereby allowing the gNB to decide whether to accept the request.

Embodiment Two

The embodiment further provides an apparatus for resource configuration for a sidelink in Internet of vehicles for implementing the above-mentioned embodiments and exemplary implementations. What has been described will not be repeated. As used below, the term "module" may be software, hardware or a combination thereof capable of implementing predetermined functions. The apparatus described below in the embodiment may be implemented by software, but implementation by hardware or by a combination of software and hardware is also possible and conceived.

Figure 12:
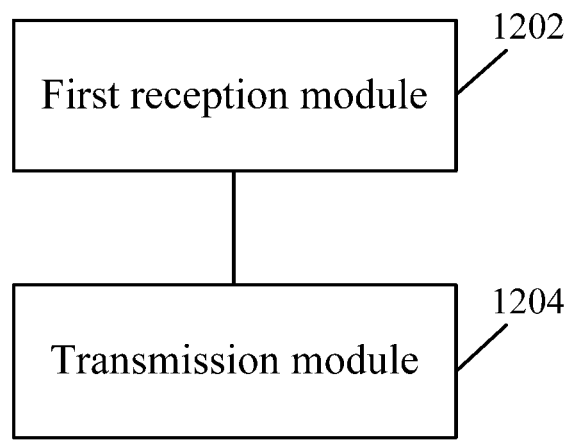
FIG. 12 is a schematic structure diagram of an apparatus for resource configuration for a sidelink in Internet of vehicles according to an embodiment of the present disclosure.

FIG. 12 is a schematic structure diagram of an apparatus for resource configuration for a sidelink in Internet of vehicles according to an embodiment of the present disclosure. The apparatus is applied on a terminal side. As shown in FIG. 12, the apparatus includes a first reception module 1202 configured to receive configuration information about a sidelink BWP/resource pool and includes a transmission module 1204 coupled to the first reception module 1202, and the transmission module 1204 is configured to perform sidelink data transmission according to the received configuration information about the sidelink BWP/resource pool.

The configuration information about the sidelink BWP includes at least one of: a BWP index, a BWP bandwidth, a BWP position, a sub-carrier spacing, a cyclic prefix, or information about one or more of a destination ID/PPPP/5QI/QFI/PDB/priority.

Additionally, the configuration information about the sidelink BWP further includes sidelink BWP mapping information for indicating a mapping between a sub-carrier spacing and information about a destination ID/PPPP/5QI/QFI/PDB/priority.

In an alternative implementation of the embodiment, the transmission module 1204 is further configured to determine, according to the received configuration information about the sidelink BWP, a sidelink BWP and/or sidelink resource pool for transmitting/receiving data.

In an alternative implementation of the embodiment, the apparatus further includes a first transmission module configured to transmit request information to a base station before the first reception module receives the configuration information about the sidelink BWP.

The request information includes at least one of: a V2X related SI request; a resource configuration request for sidelink synchronization, and/or sidelink discovery, and/or sidelink broadcast/groupcast communication, and/or sidelink unicast communication; a resource configuration request for an LTE sidelink; a transmission and/or reception interest indication for sidelink discovery; a transmission and/or reception interest indication for sidelink unicast communication; a transmission and/or reception interest indication for sidelink groupcast/broadcast communication; a sidelink unicast communication destination ID or a sidelink broadcast/groupcast communication destination ID; a PPPP/5QI/QFI/PDB/priority/PER/GFBR/PBR/ARP; or information about a sub-carrier spacing.

Each sidelink unicast communication destination ID includes at least one of: a unicast peer UE identity, a geographic position of a peer UE, and/or information about a beam index/beam direction.

It is to be noted that information about the sidelink BWP/resource pool involved in the embodiment includes at least one of: a synchronization sidelink BWP, a broadcast sidelink BWP/resource pool, a sidelink groupcast BWP/resource pool, or a sidelink unicast BWP/resource pool.

Additionally, the sidelink BWP/resource pool further includes: an initial sidelink BWP/resource pool; where the initial sidelink BWP/resource pool is configured for establishing a sidelink unicast connection and/or for transmitting or receiving signaling for unicast data transmission resource configuration over the corresponding sidelink BWP/resource pool.

A manner of the unicast data transmission resource configuration includes the following: a first terminal transmits an available sidelink BWP and/or sidelink resource pool carrying V2X service information to a second terminal; and the first terminal receives the following information transmitted by the second terminal: acceptable V2X service information and/or configuration of a supported sidelink BWP/resource pool for transmission and/or reception.

In another alternative implementation of the embodiment, the apparatus in the embodiment may further include a selection module, or a processing module, or a first activation module, or a second activation module, or a second reception module, or a third reception module, or a fourth reception module. The selection module is configured to select, according to the configuration information about the sidelink BWP and one of information about a destination ID/PPPP/5QI/QFI/PDB/priority or information about an available sub-carrier spacing corresponding to a data packet/logical channel, a sidelink BWP/resource pool corresponding to the destination ID/PPPP/5QI/QFI/PDB/priority/available sub-carrier spacing to perform the data transmission. The processing module is configured to determine, according to information about a sub-carrier spacing or information about a destination ID/PPPP/5QI/QFI/PDB/priority corresponding to a service which the terminal is interested in receiving, a sidelink BWP/resource pool to be monitored to or to be received. The first activation module is configured to receive an index of an activated SL BWP/resource pool indicated by a base station through RRC signaling. The second activation module is configured to receive an index of an activated SL BWP/resource pool indicated by a base station through DCI. The second reception module is configured to receive an SL transmission and/or reception BWP/resource pool information/index included in PC5 signaling. The third reception module is configured to receive an index of an activated/switched SL BWP/resource pool included in SCI. The fourth reception module is configured to receive configuration of an inactivity timer transmitted by a base station, and when the inactivity timer times out, the terminal returns to an initial sidelink unicast BWP/resource pool.

For an unpaired spectrum, a same Uu BWP is multiplexed for a sidelink BWP, paging and SI; and/or for a scenario where a Uu UL resource is used for a sidelink, a sidelink BWP and a UL BWP are configured to be the same, or a sidelink BWP and a UL BWP are configured to be superposed in frequency domain; and/or for a scenario where a dedicated PC5 carrier is used for a sidelink, a sidelink BWP and a Uu BWP are independently configured.

The configuration information about the sidelink resource pool includes at least one of: a time-frequency domain position of a sidelink resource, time-frequency domain position information about an SCI resource, time-frequency domain position information about a data resource, information about a sub-carrier spacing, or a unicast/groupcast/broadcast indication.

Additionally, the configuration information about the sidelink resource pool includes at least one of: configuration information about a transmission and/or reception resource pool of a serving cell or a UE-camped cell; configuration information about a transmission and/or reception resource pool of a neighboring cell/inter-frequency; configuration information about a sidelink transmission and/or reception resource pool corresponding to LTE and/or NR; configuration information about a transmission and/or reception resource pool for sidelink discovery; configuration information about a transmission and/or reception resource pool of sidelink communication; or configuration information about a sidelink transmission and/or reception resource pool of sidelink groupcast/broadcast/unicast.

Alternatively, the apparatus of the embodiment may further include a fifth reception module configured to receive sidelink bearer and/or logical channel configuration information transmitted by a base station.

Alternatively, the apparatus of the embodiment may further include a second transmission module configured to transmit an SR for requesting a sidelink resource.

Alternatively, the apparatus of the embodiment may further include a sixth reception module which is configured to: before the second transmission module transmits the SR for requesting the sidelink resource, receive SR configuration information in at least one of the manners described below.

Mapping information, which is configured by a base station, of a sidelink BWP resource and an SR resource is received; SR configuration, which is transmitted by a base station and dedicated to requesting a sidelink communication/discovery resource, is received; a system reserved LCID value for indicating that a sidelink discovery and/or communication resource is requested; or a mapping, which is transmitted by a base station, between a V2X frequency and an SR resource is received.

Alternatively, the apparatus of the embodiment may further include a third transmission module configured to transmit a sidelink BSR to a base station, where the sidelink BSR includes an index of a sub-carrier spacing or an SL BWP ID.

Alternatively, the apparatus of the embodiment may further include a sixth reception module configured to receive sidelink grant DCI transmitted by a base station, where the sidelink grant DCI includes an identity/index of a sidelink BWP and/or an identity/index of a sidelink transmission resource pool corresponding to a resource.

Alternatively, the apparatus of the embodiment may further include a determination module and a scheduling module. The determination module is configured to determine a sidelink transmission resource pool and/or a sidelink BWP corresponding to a sidelink grant after the sixth reception module receives the sidelink grant DCI transmitted by the base station. The scheduling module is configured to schedule, according to information about a sub-carrier spacing/destination ID/PPPP/5QI/QFI/PDB/priority corresponding to the determined sidelink transmission resource pool and/or sidelink BWP, data of a logical channel corresponding to the sub-carrier spacing/destination ID/PPPP/5QI/QFI/PDB/priority, assemble the data into a MAC PDU and perform sidelink transmission.

Alternatively, the apparatus of the embodiment may further include a fourth transmission module configured to transmit sidelink V2X SPS assistance information to a base station and include a seventh reception module configured to receive sidelink V2X SPS configuration transmitted by the base station.

The sidelink V2X SPS assistance information includes at least one of: an SPS type indication, a duration, a 5QI/QFI/PDB/delay/critical/Priority, or an available sub-carrier spacing.

The sidelink V2X SPS configuration includes at least one of: an SPS cycle, an offset, an identity/index of a sidelink BWP/resource pool corresponding to an SPS resource, a frequency domain resource position and size, or a validity period.

It is to be noted that each module described above may be implemented by software or hardware. An implementation by hardware may, but may not necessarily, be performed in the following manners: the various modules described above are located in the same processor, or the various modules described above are located in their respective processors in any combination form.

According to an embodiment of the present disclosure, a storage medium is further provided. The storage medium is configured to store a computer program. The computer program is configured to, when executed, perform the steps in any preceding method embodiments.

Alternatively, in the embodiment, the preceding storage medium may be configured to store the computer program for executing the following steps: in step S1, a terminal receives configuration information about a sidelink BWP/resource pool; and in step S2, the terminal performs sidelink data transmission according to the received configuration information about the sidelink BWP/resource pool.

Alternatively, in the embodiment, the preceding storage medium may include, but is not limited to, a USB flash drive, a read-only memory (ROM), a random access memory (RAM), a mobile hard disk, a magnetic disk, an optical disk or another medium capable of storing a computer program.

According to an embodiment of the present disclosure, an electronic apparatus is further provided and includes a memory and a processor. The memory is configured to store a computer program, and the processor is configured to execute the computer program to perform the steps in any preceding method embodiment.

Alternatively, the preceding electronic apparatus may further include a transmission device and an input and output device. Both the transmission device and the input and output device are connected to the processor.

Alternatively, in the embodiment, the preceding processor may be configured to execute a computer program to perform the following steps: in step S1, a terminal receives configuration information about a sidelink BWP/resource pool; and in step S2, the terminal performs sidelink data transmission according to the received configuration information about the sidelink BWP/resource pool.

Alternatively, for examples in the embodiment, reference may be made to the examples described in the preceding embodiments and alternative implementations. Details are not described herein again.

Apparently, it is to be understood by those skilled in the art that each of the modules or steps of the present application may be implemented by a general-purpose computing apparatus and may be concentrated on a single computing apparatus or distributed on a network formed by multiple computing apparatuses. Alternatively, these modules or steps may be implemented by program codes executable by the computing apparatus. Thus, these modules or steps may be stored in a storage apparatus and executed by the computing apparatus. Moreover, in some cases, the illustrated or described steps may be executed in sequences different from the sequence described herein. Alternatively, these modules or steps may be implemented by being made into integrated circuit modules separately or multiple ones of these modules or steps may be implemented by being made into a single integrated circuit module. In this manner, the present application is not limited to any combination of hardware and software.

The above are merely exemplary embodiments of the present application and are not intended to limit the present application, and for those skilled in the art, the present application may have various modifications and variations. Any modifications, equivalent substitutions, improvements and the like made within the principle of the present application should fall within the scope of the present application.

What is claimed is:

1. A method for resource configuration for a sidelink communication in Internet of vehicles, comprising:
   transmitting, by a terminal, request information to a base station, the request information comprising: 5G quality of service indication (5QI), quality of service flow identity (QFI), packet delay budget (PDB), priority, packet error rate (PER), and guaranteed flow bit rate (GFBR);
   receiving, by the terminal, configuration information about a sidelink bandwidth part (BWP);
   performing, by the terminal, sidelink data transmission according to the received configuration information about the sidelink BWP;
   transmitting, by the terminal, a scheduling request (SR) for requesting a sidelink resource; and
   before transmitting, by the terminal, the SR for requesting the sidelink resource, receiving, by the terminal, SR configuration which is transmitted by the base station and dedicated to requesting the sidelink communication.

2. The method of claim 1, wherein the configuration information about the sidelink BWP comprises at least one of: a BWP index, a BWP bandwidth, a BWP position, a subcarrier spacing, or a cyclic prefix.

3. The method of claim 1, wherein the request information further comprises:
a sidelink unicast communication destination identity (ID), a sidelink broadcast communication destination ID, or a sidelink groupcast communication destination ID.

4. The method of claim 1, wherein the request information further comprises:
a resource configuration request for sidelink broadcast communication or a resource configuration request for sidelink groupcast communication.

5. The method of claim 1, wherein the sidelink BWP further comprises:
an initial sidelink BWP; wherein the initial sidelink BWP is configured for at least one of: establishing a sidelink unicast connection, or transmitting or receiving signaling for unicast data transmission resource configuration over a corresponding sidelink BWP.

6. The method of claim 5, wherein the unicast data transmission resource configuration comprises:
transmitting, by a first terminal to a second terminal, an available sidelink BWP carrying vehicle to everything (V2X) traffic information; and
receiving, by the first terminal, at least one of the following information transmitted by the second terminal: acceptable V2X service information, configuration of a supported sidelink BWP for transmission, or configuration of a supported sidelink BWP for reception.

7. The method of claim 1, further comprising at least one of:
for an unpaired spectrum, multiplexing a same Uu BWP for the sidelink BWP, paging and SI;
for a scenario where a Uu uplink (UL) resource is used for the sidelink communication, configuring a same sidelink BWP and a UL BWP, or configuring the sidelink BWP and the UL BWP to be superposed in frequency domain; or
for a scenario where a dedicated PC5 carrier is used for the sidelink communication, configuring the sidelink BWP and the Uu BWP independently.

8. The method of claim 1, further comprising receiving, by the terminal, configuration information about a sidelink resource pool; and
wherein the configuration information about the sidelink resource pool comprises configuration information about a sidelink transmission and/or reception resource pool corresponding to at least one of LTE or new radio (NR).

9. The method of claim 8, further comprising performing, by the terminal, the sidelink data transmission according to the received configuration information about the sidelink resource pool.

10. The method of claim 1, further comprising:
receiving, by the terminal, at least one of sidelink bearer channel configuration information or sidelink logical channel configuration information transmitted by the base station.

11. The method of claim 1, further comprising:
receiving, by the terminal, sidelink grant downlink control information (DCI) transmitted by the base station, wherein the sidelink grant DCI comprises an index of the sidelink BWP.

12. An electronic apparatus, comprising a memory and a processor, wherein the memory is configured to store a computer program, and the processor is configured to execute the computer program to perform steps comprising:
transmitting, by a terminal, request information to a base station, the request information comprising: 5G quality of service indication (5QI), quality of service flow identity (QFI), packet delay budget (PDB), priority, packet error rate (PER), and guaranteed flow bit rate (GFBR);
receiving, by the terminal, configuration information about a sidelink bandwidth part (BWP);
performing, by the terminal, sidelink data transmission according to the received configuration information about the sidelink BWP;
transmitting, by the terminal, a scheduling request (SR) for requesting a sidelink resource; and
before transmitting, by the terminal, the SR for requesting the sidelink resource, receiving, by the terminal, SR configuration which is transmitted by the base station and
dedicated to requesting a sidelink communication.

* * * * *